(12) United States Patent
Marsyla et al.

(10) Patent No.: US 8,014,995 B2
(45) Date of Patent: Sep. 6, 2011

(54) VIRTUAL DEVICE INTERACTIVE RECORDING

(75) Inventors: David John Marsyla, Belmont, CA (US); Faraz Ali Syed, Dublin, CA (US); John Tupper Brody, Belmont, CA (US); Jeffrey Allard Mathison, Pacifica, CA (US)

(73) Assignee: Mobile Complete, Inc., San Mateo, CA (US)

( * ) Notice: Subject to any disclaimer, the term of this patent is extended or adjusted under 35 U.S.C. 154(b) by 522 days.

(21) Appl. No.: 12/028,747

(22) Filed: Feb. 8, 2008

(65) Prior Publication Data

US 2008/0195942 A1    Aug. 14, 2008

Related U.S. Application Data

(60) Provisional application No. 60/900,405, filed on Feb. 9, 2007.

(51) Int. Cl.
*G06F 9/455*    (2006.01)

(52) U.S. Cl. ............................ 703/23; 703/13; 715/854

(58) Field of Classification Search .................... 703/13, 703/23
See application file for complete search history.

(56) References Cited

U.S. PATENT DOCUMENTS

| | | | | |
|---|---|---|---|---|
| 5,542,070 | A * | 7/1996 | LeBlanc et al. | 703/20 |
| 6,631,345 | B1 * | 10/2003 | Schumacher et al. | 703/22 |
| 7,343,568 | B2 * | 3/2008 | Jiang et al. | 715/854 |
| 7,499,848 | B2 * | 3/2009 | Irons | 703/23 |
| 7,562,019 | B2 * | 7/2009 | Cohen et al. | 704/270 |
| 7,613,599 | B2 * | 11/2009 | Bade et al. | 703/14 |
| 7,647,561 | B2 * | 1/2010 | Zondervan et al. | 715/762 |
| 7,672,935 | B2 * | 3/2010 | Rowley | 707/711 |
| 7,788,358 | B2 * | 8/2010 | Martino | 709/223 |
| 7,813,910 | B1 * | 10/2010 | Poulin | 703/22 |
| 2002/0193145 | A1 | 12/2002 | Latvakoski et al. | |
| 2003/0115572 | A1 | 6/2003 | Zondervan et al. | |
| 2003/0236088 | A1 | 12/2003 | Im | |
| 2004/0204076 | A1 | 10/2004 | Kotzin | |
| 2005/0054381 | A1 | 3/2005 | Lee et al. | |

(Continued)

FOREIGN PATENT DOCUMENTS

WO    WO-91/00575 A1    1/1991

(Continued)

OTHER PUBLICATIONS

Loh et al, "Virtual Prototyping of Cellular Phones", Software Practice and Experience, 29(10), pp. 897-929, 1999.*

(Continued)

*Primary Examiner* — Mary C Jacob
(74) *Attorney, Agent, or Firm* — Morrison & Foerster LLP

(57) ABSTRACT

The present invention provides a mechanism for recording interactions with a Mobile Device to create a map of the structure of the menu system, Mobile Applications, and Mobile Service available on the device. A Recording/Control Environment is integrated with a physical Mobile Device, controls the Mobile Device, and records the resulting data from the Device. The Recording/Control Environment then saves the data as a map of the system structure. Once this graph has been created with a state representing every page available on the device, and with links representing every way of navigating between the individual states of the device, the graph can be used to re-create the experience of interacting with the device. A user may then virtually interact with a representative device through a Run-Time Environment, which uses the map structure to replay the interactions of the mobile device.

28 Claims, 8 Drawing Sheets

U.S. PATENT DOCUMENTS

2005/0118996 A1    6/2005    Lee et al.

FOREIGN PATENT DOCUMENTS

WO    WO-2008/098209 A2    8/2008
WO    WO-2008/098209 A3    8/2008

OTHER PUBLICATIONS

Tuikka et al, "User Actions as a Mediator for Concept Designers", Proceedings of the 34th Hawaii International Conference on System Sciences, 2001.*

Sokolewicz et al, "Using the GIVEN Toolkit for System Development in MuSE", Selected Papers of the Eurographics Workshops on Virtual Environments '95, pp. 273-289, 1995.*

Carroll, Hyrum, "A Trace-Driven Simulator for PALM OS Devices", Thesis, Bringham Young University, Sep. 2004.*

International Search Report mailed Jul. 21, 2008, for PCT Application No. PCT/US2008/053485, two pages.

Supplementary European Search Report mailed Oct. 29, 2010, for EP Application No. 08729449.2, filed Feb. 8, 2008, 10 pages.

* cited by examiner

US 8,014,995 B2

VIRTUAL DEVICE INTERACTIVE RECORDING

CROSS-REFERENCE TO RELATED APPLICATIONS

The present invention claims the benefit, under 35 USC 119(e), of U.S. provisional patent application Ser. No. 60/900,405 filed Feb. 9, 2007, entitled "Virtual Device Interactive Recording," the contents of which are incorporated by reference herein.

BACKGROUND OF THE INVENTION

A large variety of mobile information processing devices ("Mobile Devices") are produced each year. Consumers of Mobile Devices are faced with a variety of choices when purchasing a device, and more than 70% of all consumers do some sort of research on the Internet before making a purchase, and roughly 15% of all consumers actually purchase a device from the Internet.

Previously, only general information has been available about the functionality of a Mobile Device itself its wireless data services ("Mobile Services"), and downloadable applications ("Mobile Applications"). This information has generally consisted of device specifications such as display size, memory size, wireless network compatibility, and battery life information.

As Mobile Devices, Mobile Services, and Mobile Applications become more sophisticated, there is a need to provide a more extensive and interactive preview of the device and services available for consumers. Previously, attempts have been made to show mobile products and services using visual demonstrations created with standard authoring tools such as HTML or Adobe Flash, but these generally provide a limited and non-interactive representation of the actual functionality being offered. These representations are limited by the nature of how they are created, generally by taking still photographs of a device LCD display and piecing these individual frames together into a mock-up of the actual application or service. Also, since the demonstrations must be created in advance, it has not been possible to make them interactive in any way that is similar to the actual experience of the application on the live device.

SUMMARY OF THE INVENTION

The present invention provides a mechanism for recording and mapping interactions with a Mobile Device with the goal of creating a map, or graph, of the structure of the menu system, Mobile Applications, and Mobile Service available on the device. The information recorded in the graph can then be played back interactively at a later time.

The recordings are made by interacting with a physical Mobile Device that has been integrated in some way into a recording and control environment ("Recording/Control Environment"). This environment has the ability to control the interface of the Mobile Device, and record the resulting video and audio data that is produced from the device.

Each page that is available in the menu structure of the Mobile Device can be identified and represented as a state in a large multi-directional graph. Each state of the graph is connected to other states in the graph by links representing the paths that are used to navigate between the pages. For example, if the home page of the Mobile Device is represented by a state in the graph labeled "Home" and the menu of applications on the device is represented by another state on the graph labeled "Menu," then the key that is used to navigate between the two pages would form a link between the states of the graph.

Once this graph has been created with a state representing every page available on the device, and with links representing every means of navigating between the individual states of the device, the graph can be used to re-create the experience of interacting with the device. As a consumer interacts with a virtual version of the device, they are able to use the virtual navigation buttons or virtual touch screen to navigate to different recorded states of the device. As they navigate to each state, the original recordings are played back simulating what would be seen on the device in that state. In this way the graph can be freely navigated to experience the device, or the applications and services available from the device.

Although a typical Mobile Device may actually have several million unique states and configurations, for the purposes of providing a rich experience that is representative of the device, it is generally only necessary to map around one million unique states and the navigation paths between each state. This large number of states could be mapped by manually traversing to each state and recording the interaction, or could be done through an automated process that searches for unmapped states and automatically builds the interactive graph of the device.

DETAILED DESCRIPTION OF THE PREFERRED EMBODIMENTS

In the following description of preferred embodiments, reference is made to the accompanying drawings, which form a part hereof, where it is shown by way of illustration specific embodiments in which this invention can be practiced. It is to be understood that other embodiments can be utilized and structural changes can be made without departing from the scope of the preferred embodiments of the invention.

Figure 1:
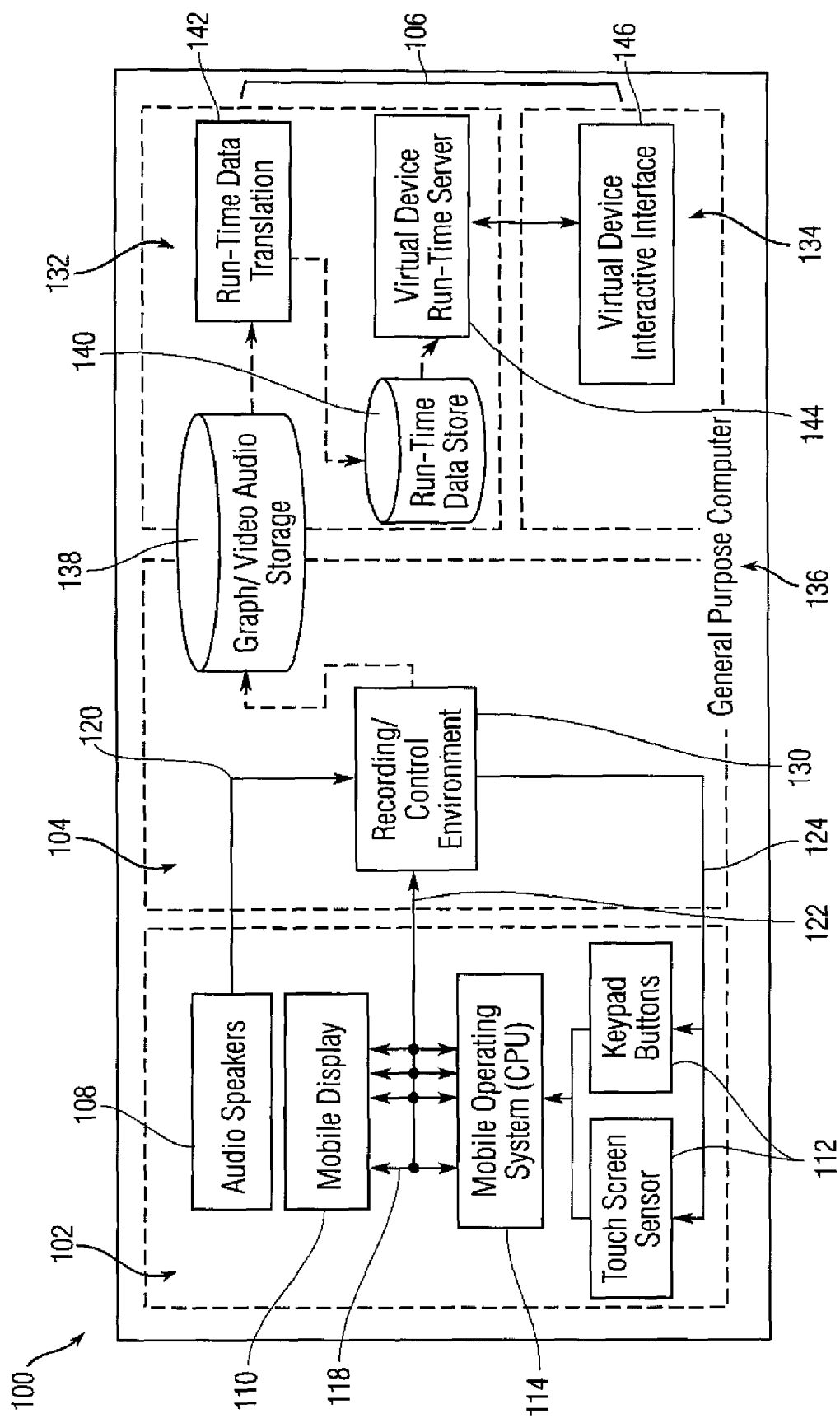
FIG. 1 illustrates an exemplary system block diagram employing a Design-Time Environment and a Run-Time Environment according to embodiments of the invention.

FIG. 1 illustrates a representative block diagram of the system 100, including the physical Mobile Device 102, Design-Time Environment 104, and Run-Time Environment 106. The Mobile Device 102 may be any mobile information processing device. The Design-Time Environment 104 has the ability to control the interface of the Mobile Device, and record the resulting video and audio data that is produced from the device. Finally, the Run-Time Environment 106 converts the data from the Design-Time Environment 104 into a media to play back to a user, and permits a user to interactively navigate a simulated Mobile Device including the appearance, the Mobile Services, and the Mobile Applications associated with the physical Mobile Device.

Mobile Device 102 is a portable information processing device such as a cell phone or PDA which is commonly used to execute or view Mobile Services and Mobile Applications. The most common configuration of a Mobile Device is a small handheld device, but many other devices such as digital audio players (e.g. MP3 players). Digital cameras that may have similar displays are also within the scope of the invention. Other Mobile Devices may include laptops or GPS devices.

The Mobile Device 102 will typically have audio speakers 108, a display 110, and one or more input devices 112, such as a keypad or touch screen. The Mobile Device 102 will also, typically, have an operating system 114. The speakers 108 may generate sound when keys are pressed, or when applications are running on the device. The mobile display 110 is the display of a Mobile Device which is used to display information about the status of the Mobile Device and to allow interaction with mobile content or other information services available on the device. The operating system 114 is the processing system that is used to control the functionality of the Mobile Device. The operating system may be comprised of a central processing unit (CPU), volatile and non-volatile computer memory, input and output signal wires, and a set of executable instructions, which control the function of the device.

The most common configuration of the display 110 is a small flat panel LCD display, but could also be made from any other display types such as Plasma or OLED technologies. The most common configurations for the operating system 114 are open development platforms such as BREW, Symbian, Windows Mobile, Palm OS, Linux, along with various proprietary platforms developed by Mobile Device manufacturers.

The Mobile Device 102 will generally include input devices 112 to select or control the Mobile Applications or Mobile Services. The input devices 112 may include buttons, knobs, touch screens, key pads, number pads, or any combination thereof. For example, the Mobile Device may include a touch screen sensor, incorporating the input device and the display into one unit. A touch screen input can be used to select menus or applications to run on the device. The touch screen may be a touch sensitive panel that fits over an LCD display of the device, and allows a user to use a stylus or other object to click on a region of the screen. Alternatively, or in conjunction with a touch screen, the Mobile Device may include keypad buttons. The buttons may be used to navigate between menus on the device, and to enter text and numerical data on the device. The Mobile Device may include a numerical pad with numbers 0-9, #, *, and a set of navigation keys including directional arrows, select, left and right menu keys, and send and end keys. Some devices may have full keypads for entering numerical data, or may have multiple keypads that are available in different device modes.

Communication data and control signals 118 make up the information that is being transferred from the operating system 114 to the display 110 with the purpose of forming graphical images, or displaying other information on the display 110. As the information passes from the operating system 114 to the display 110, translations of the display information may occur by various intermediate hardware graphics processors. The translations may be simple, such as converting a parallel data stream (where data is transferred across many wires at once) into a serial data stream (where data is transferred on a smaller number of wires). There may also be more complex translations performed by a graphics processing unit (GPU) such as converting higher level drawing or modeling commands into a final bitmap visual format. Although the information may take different forms at various processing stages, the information is meant to accomplish the task of displaying graphical or other information on the display, and whichever format the data is available at a particular state is within the scope of this invention.

The audio data 120 is all of the aural information that is available on the device 102. This information is extracted from the physical device to make the audio data available to the Design-Time Environment 104. The extraction may be by means of an analog to digital converter. This is generally done by either connecting to the headset provided with the device, or removing the speakers from the device and connecting to the points where the audio would be generated to the speakers. This information could also be extracted from the device in native digital audio format which would not require a conversion to digital.

The Passive Data Extraction is a means to intercept and copy the Communication Data and Control Signals 118 and make this raw information available to the Recording/Control Environment 130. The purpose of the interception is to passively copy the information as it is being transferred to the display 110, but it is equally valid to use a disruptive approach to extract the information. Although a disruptive approach to extract the communication data may interfere with the operation of the mobile display, this may be immaterial where only the Recording/Control Environment 130 is needed to interact with the device.

The preferred configuration for the Passive Data Extraction is a hardware sensor that can detect the signal levels of the Communication Data and Control Signals 118 and make a digital copy of that information as it is being transferred to the display 110. Generally available products such as Logic Analyzers may be utilized, as well as custom hardware designed specifically to extract this digital information from Mobile Device 102. Any method that is used to extract this information is within the scope of this invention.

Although the preferred configuration of the Passive Data Extraction uses a hardware based extraction of the Communication Data and Control Signals 118, a similar software agent based approach may alternatively be used to extract the raw information that is fed into the Recording/Control Environment 130. In this instance, the software agent would be a software program running on the mobile operating system 114 itself and communicating with the Recording/Control Environment 130 through any standard communication channel found on the Mobile Device 102. This communication channel could include over-the-air communication, USB, Serial, Bluetooth, or any number of other communication protocols used for exchanging information with an application running on the mobile operating system 114.

The Navigation Control 124 is a means to control the Mobile Device 102 from the Design-Time Environment 104. The preferred integration with the device is to use a hardware based integration to electrically stimulate keypad button presses and touch screen selections. This could also be controlled using a software interface with the device operating system 114. The software interface could communicate with a software agent running on the device through the device data cable, or through an over the air communication such as Bluetooth. This communication channel could include over-the-air communication, USB, Serial, Bluetooth, or any number of other communication protocols used for exchanging information with an application running on the mobile operating system 114.

The Recording/Control Environment 130 is used to stimulate the Mobile Device 102 or its input devices 112, including keypad buttons or touch screen, and record the audio 120 and video 122 responses from the device. One goal of the recording environment is to identify the unique states, or pages, of the device user interface, and to establish the Navigation Links between those pages. Navigation Links are the key or touch screen area that must be pressed to navigate from one page of the Mobile Device 102 to another page. The recording environment can be used by a person manually traversing through the menus of the Mobile Device 102, or could be controlled by an automated computer process that searches for unmapped navigation paths and automatically detects states on the device. The automated computer process, after determining the unmapped navigation paths, may control the Device 102 to navigate to the unmapped states by either stimulating the input devices 112 or bypassing the input devices and simulating the input signals directly to the operating system 114. Therefore, the Mobile Device 102 is stimulated through an interface, whether the device inputs 112 or the direct command to the operating system 114.

The Graph Video Audio Storage 138 system is a repository of information which is stored during the design time recording of the device interactions. The storage system can be a standard relational database system, or could simply be a set of formatted files with the recording information. The recording information may take the format of database table elements representing a large multi-directional graph. This graph represents the map of the structure of the menus and applications on the Mobile Device 102. Additionally, the storage system contains both audio and video, or still frame, information that was recorded from the Mobile Device.

The Run-Time Environment 106 may include the Run-Time Server 132 and the Run-Time Client 134. The Run-Time Environment 106 permits a user to interact and play back the recorded information from the Design-Time Environment 104. The Run-Time Environment 106 may be divided into a Run-Time Server 132, which converts the information from the Design-Time Environment 104 into a form to play back to a user, and a Run-Time Client 134, which permits a user to interact with a virtual representation of the Mobile Device. Alternatively, the Run-Time Server 132 and the Run-Time Client 134 may be integrated into a single unit to convert and play back the information generally simultaneously.

The Run-Time Server 132 may be a standard web application server. The server may also be a custom design server, but preferably it conforms to standard web request and response interactions using the HTTP protocol. If a non-standard client is being used, then the Run-Time Server 132 may also support non-standard formats and would not need to comply with HTTP protocol standards. This is less desirable however since it would make the system less accessible to consumers.

The Run-Time Data Translation 142 converts the information obtained while recording interactions with the Mobile Device, from the Design-Time Environment 104, into a format that can be used for traversing a virtualized version of the device from standard platforms such as internet web servers and internet web browsers. This step is primarily responsible for converting the recorded information into lower resolution, and lower fidelity to minimize data transfer needs in a hosted web environment. Although this process is most efficiently performed as a separate step, it could also be folded into the recording process so the conversions are done while the information is being recorded. It could also be folded into the run-time request system, but this would be quite inefficient since it may require multiple conversions of the same information.

The Run-Time Data Storage 140 is a repository of information which is accessed during run-time execution of the interactive device session. The storage system can be a standard relational database system, or could be a set of formatted files with the recording information. The run-time information generally takes the format of formatted image, video, audio, and XML files stored on a disk drive. The Run-Time Data Storage 140 could also be the same system as the Graph/Video/Audio Storage 138, but it is generally preferable to keep the systems separate to allow for easier deployments into new environments.

The Virtual Device Run-Time Server 144 is generally a standard web application server. The server may also be a custom design server, but generally it should conform to standard web request and response interactions using the HTTP protocol. If a non-standard client is being used, then the run-time server could also support non-standard formats and would not need to comply with HTTP protocol standards. This is less desirable however since it would make the system less accessible to consumers.

The Run-Time Client 134 is composed of the Virtual Device Interactive Interface 146, which may be a standard web browser application. The client may also be a custom designed client. Preferably, the Run-Time Client 134 conforms to standard web request and response interactions using the HTTP protocol. If a non-standard server is being used, then the Run-Time Client 134 could also support non-standard formats and would not need to comply with HTTP protocol standards. This is less desirable however since it would make the system less accessible to consumers.

The Design-Time Environment 104 and the Run-Time Environment 106, including the Run-Time Server 132 and the Run-Time Client 134, may all be housed within a general purpose computer 136. Each environment may be stored on the same general purpose computer, or on separate computers. The General Purpose Computers 136 are any computer system that is able to run software applications or other electronic instructions. This includes generally available computer hardware and operating systems such as a Windows PC or Apple Macintosh, or server based systems such as a Unix or Linux server. This could also include custom hardware designed to process instructions using either a general purpose CPU, or custom designed programmable logic processors based on CPLD, FPGA or any other similar type of programmable logic technologies.

Figure 2:
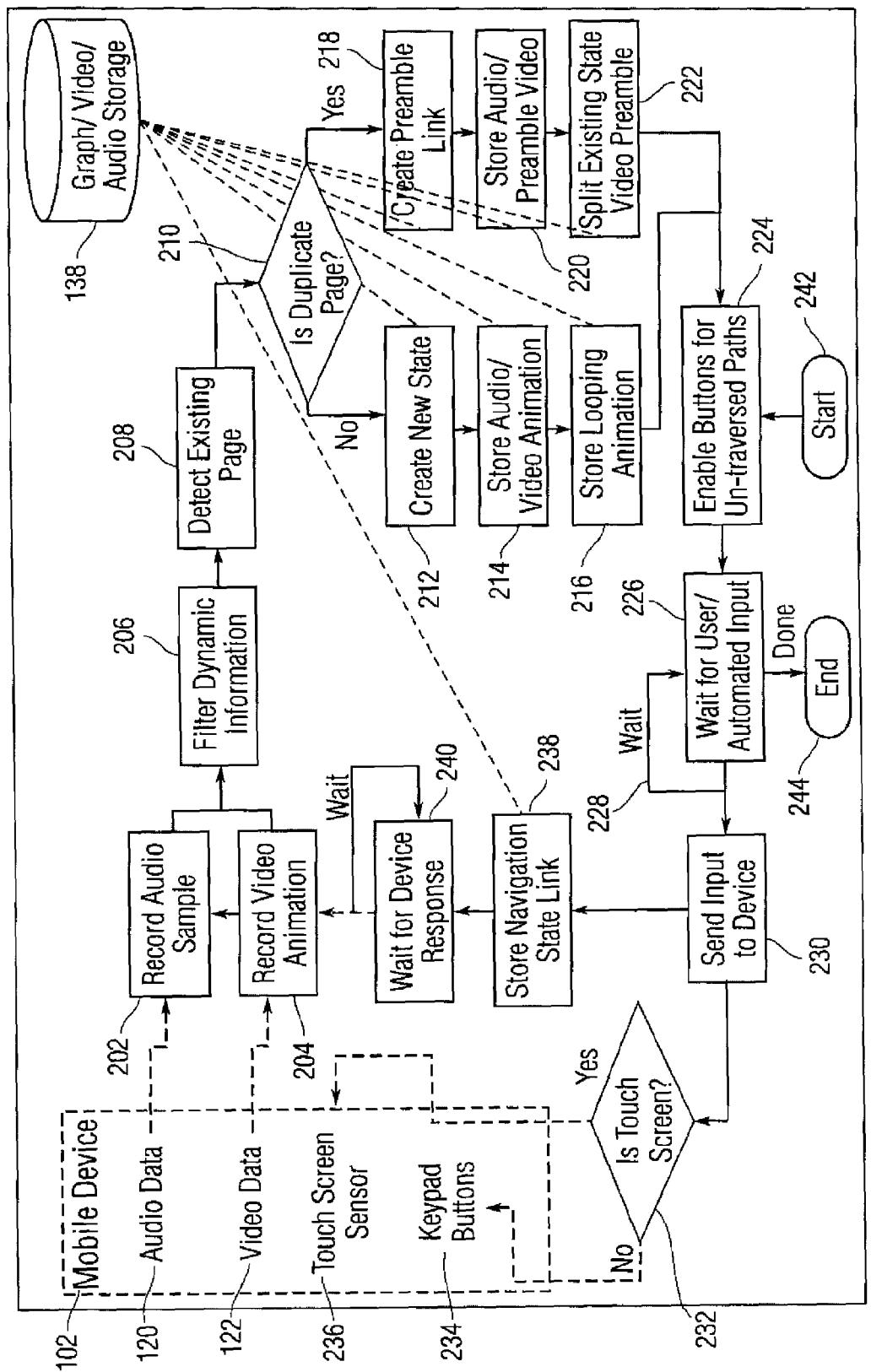
FIG. 2 illustrates exemplary Recording/Control Environment logic according to embodiments of the invention.

FIG. 2 illustrates an embodiment of the Recording/Control Environment 130 logic within the Design-Time Environment 104, of FIG. 1. The Recording/Control Environment logic 200 takes the audio and video data from the Mobile Device 102 and determines whether the information is duplicative of information previously stored. At each user or automated transition of the Mobile Device, the Recording/Control Environment takes the information, compares it to previously stored information, and appropriately places the links and pages within the previously stored information.

With reference to FIG. 2, at the top left corner at block 202, the Record Audio Sample step is the point in the recording process that will record any audio data 120 that is being produced by the Mobile Device 102. The audio information 120 is generated in response to stimulus to the device from the input devices 112, such as the touch screen or keypad buttons. At block 204, Record Video Animation, the Recording/Control Environment 130 will record any visual information 122 (video or still images) that is being produced by the Mobile Device 102. The video information 122 is also generated in response to stimulus to the device from the input devices 112.

The recorded video sample is synchronized with the audio information being recorded at the same time.

After the audio and video is recorded and synchronized, the dynamic information is filtered at block 206. This step is responsible for filtering out some of the video information that may be dynamically generated by the Mobile Device 102. This filtering is necessary to prepare the video sample for comparison to other known states of the Mobile Device user interface. Examples of dynamic information include a region of the screen that contains the current date or time, or regions of the screen that display dynamic network signal strength information. By filtering out dynamic information, it is possible to directly compare the resulting canonical samples of the still images or video samples.

Detect Existing Page 208 is the step responsible for comparing the recently recorded video sample with every existing sample saved in the Graph/Video/Audio Storage 138 to determine if the video sample is from a state that has been previously encountered on the Mobile Device 102. Comparing the new recording with existing recordings can be done by scanning every stored sample and doing a one to one comparison. Finding existing states can alternatively be accomplished by any number of standard data lookup techniques, including computing a hash value which can be used to quickly eliminate images that do not directly match and improve performance of the system. Various techniques may alternatively be used to improve the performance of the existing screen detection, they all accomplish the same goal and are within the scope of the present invention.

The next step 210 determines whether the presently saved recording is duplicative of a previously saved recording. This decision path will determine if the screen was found to be a duplicate.

If the presently saved recording is not found within the previously saved recordings, then the decision tree branches to block 212. If this is a state or a screen that the Design-Time Environment 104 has never before seen, then a new node is created in the graph of the available states within the user interface of the Mobile Device. This is the first time the Environment 104 has seen this state, but the Environment 104 may encounter it at a future time from another path in the device, and so this state is stored within the database 138 along with all of the other identified unique pages.

If the Recording/Control Environment 130 has determined that the present state is a unique state in the system, at the next step 214, it stores the audio and video sample in to the database 138 associated with this unique state. For some video animations, the screen may go into a never ending looping animation. For example, a screen with a blinking cursor, or a screen with a small animated icon could be an unending looping animation. This type of animation does not have an end, and so must be stored in a special format in the database, at block 216, indicating that the animation will continually loop through a series of frames.

If the presently saved recording is found within the previously saved recordings at block 210, then the decision tree branches to block 218. The Recording/Control Environment 130 has determined that this is a duplicate state in the graph 138, and the Mobile Device 102 has gotten to the state through a new navigation path not previously seen. It is common for Mobile Devices to use animations that end at the same state, but are different depending on the last state of the device. For example, a screen image may slowly dissolve from one state to another. In these cases, it is preferred to associate the video animation with the link between the states in the graph as a preamble sequence between states. It is also preferred to determine which portion of the complete animation that was recorded is specific to the link, and which portion is common to all links that approach the same state. To determine which portion of the video is common to all paths leading into the destination state, it is only necessary to compare all incoming recorded animations from the end to the beginning and determine when the animations start to diverge. This same approach can be taken with the recorded audio data for the state.

Once it has been determined which portion of the video is common to the destination state, and which portion is part of the prelude, or link to the state, the data associated only with the link may be stored at block 220. The remaining common video and audio information can be discarded at this point since it has already been stored associated with the destination state.

It may not be determined which portion of the video and audio data recorded for a state are common to all incoming paths until at least two samples have been gathered for animations leading to the state. It is sometimes necessary to analyze every path that may lead to a particular state before a final determination can be made about the parts of the video that are common to all incoming states. Since an incorrect assessment may be made about the distinction of common versus preamble video before all links in the graph have been traversed, it may be preferable, at block 222, to split existing states into different divisions of common versus preamble video.

From any given state in the device user interface, it is known which navigation paths have already been taken from the state, and which ones have not yet been traversed. In step 224, the Environment 130 can use this information to enable the buttons or touch screen regions that have not yet been traversed. This step is not necessary, but preferable as without this step, it is possible to traverse to states that have already been examined. If this is done, the states can simply be ignored since they have already been mapped into the system.

The next step 226 waits for User/Automated Input. This step will wait for input from a user manually using the recording interface, or from an automated computer process that is controlling the creation and recording of the device states. The wait 228 can generally be any amount of time as long as it is not so long that it causes the device to enter into some alternate state on its own. An example of this alternate state would be an automated screen saver that appears after waiting for a short amount of time. Preferably, an automated process should try to wait the shortest amount of time possible.

Based on the input specified by the user or the automated process, step 230 will send that input to the device, and also transition to the next states to wait for the device to produce a response to the input.

Step 232 will determine if the incoming event is a keypad button or touch screen selection event. This will determine how the physical device is stimulated with the input. The Mobile Device 102 is then appropriately stimulated by either selecting the appropriate keypad buttons 234 or touch screen sensor locations 236.

Once the navigation is known from the previous state, a new link can be created in the graph at step 238 with the source of the link being the previous state, and the destination of the link to be determined based on the response from the device. The destination of the link may be a new state, or eventually be determined to be an existing state. If this navigation path has already been taken on the device, this step can be bypassed.

The Wait for Device Response 240 step will wait for a response to be available from the device. In general a response must occur in a short amount of time (around 10 seconds or so) to be sure that the response is associated with the input, and not associated with some internally generated event such as a screen saver.

The recording process 200 is a circular process, and so, it may begin at any point. The most natural starting point is to choose a particular starting state and enable the un-traversed paths from the current state, such as at location 242. Because of the circular process, it may also end at any point. The most natural ending point is while waiting for user or automated input at location 244.

Figure 3:
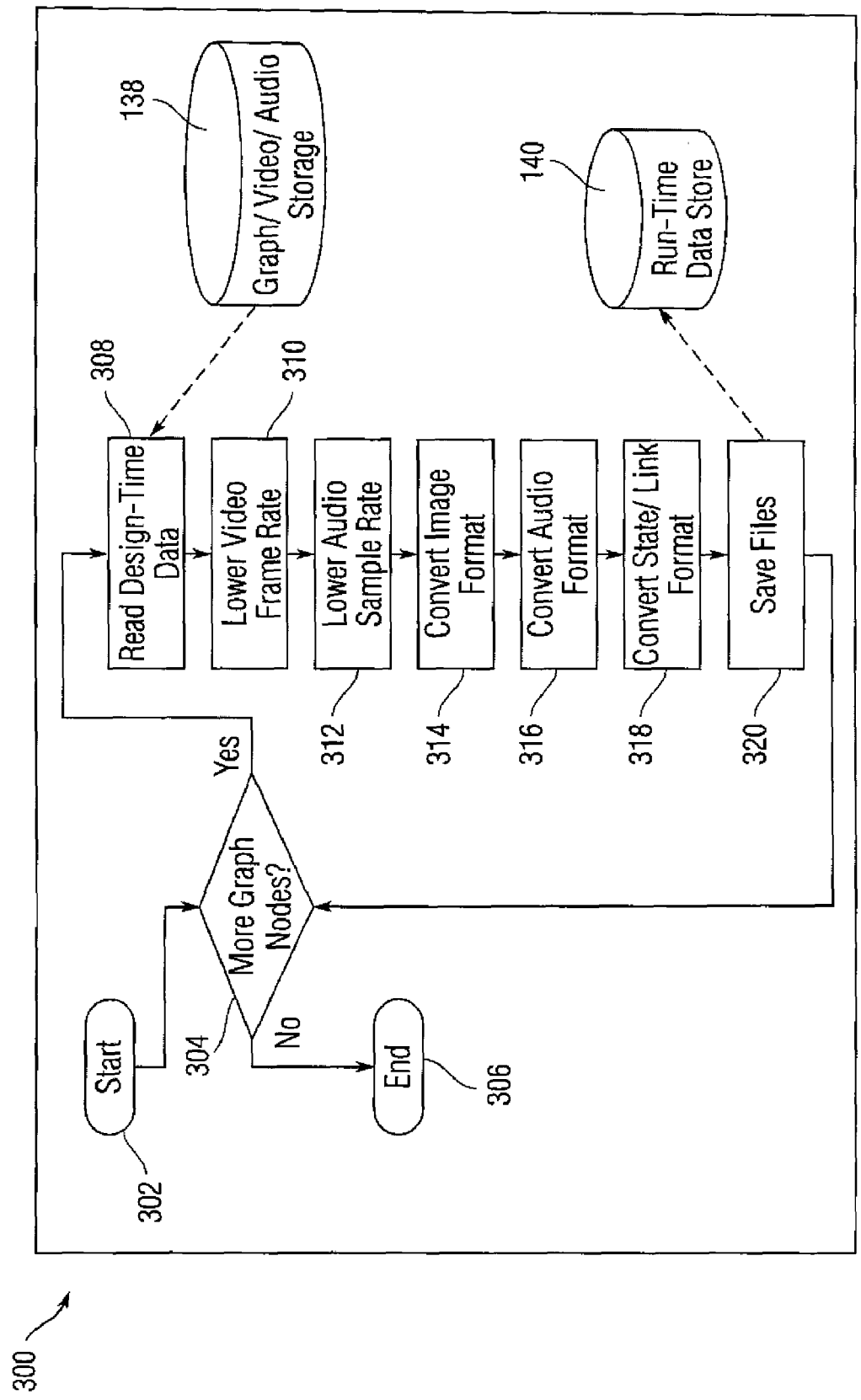
FIG. 3 illustrates exemplary Run-Time Data Translation logic according to embodiments of the invention.

FIG. 3 illustrates one embodiment of the Run-Time Data Translation logic 300 of block 142 of FIG. 1. The run time data translation processes convert the information obtained while recording interactions with the Mobile Device into a format that can be used for traversing a virtualized version of the device from standard platforms such as internet web servers and internet web browsers. This step is primarily responsible for converting the recorded information into lower resolution, and lower fidelity version to minimize data transfer needs in a hosted web environment. Although this process is most efficiently performed as a separate step, it could also be folded into the recording process so the conversions are done while the information is being recorded. It could also be folded into the run-time request system, but this would be quite inefficient since it may require multiple conversions of the same information.

With reference to FIG. 3, the process 300 for the Run-Time Data Translation Logic is generally started at block 302 after the recording process is complete, the process from FIG. 2, above. The process is a circular process that will process all information until completed. It is also possible to perform this translation incrementally and convert only data that has not been previously converted. No matter how the process is executed, the result is to arrive at a point where all states in the graph have been converted to the run-time data format.

The process will continue as long as there are graph nodes to convert into the new format. Therefore, step 304 will determine if there is more work to do, or if the process should end. If all graph nodes have been converted into the new format, then the process 300 ends at step 306. At this point all information has been converted to the run-time format. However, if there are more graph nodes to convert, then the process 300 continues the conversion at block 308.

The first step of the actual conversion of the graph node information is at step 308, Read Design-Time Data. This step will read in all of the design-time data for a particular state in the graph that has not yet been converted to the run-time format. This step will interact with the Graph/Video/Audio Storage 138 that was used to store the design-time information.

After the information is read, the process 300 then lowers the video frame rate at step 310. This step is responsible for lowering the frame rate of the video sample to a lower rate than was originally sampled from the Mobile Device 102. This step is necessary to reduce the amount of information needed in the run-time interactive device. This step may not be necessary if the original device information was recorded at a sufficiently low frame rate. The audio sample rate is also lowered at step 312. This step is responsible for lowering the sample rate of the audio sample to a lower rate than was originally sampled from the Mobile Device 102. This step is necessary to reduce the amount of information needed in the run-time interactive device. This step may not be necessary if the original device information was recorded at a sufficiently low sample rate. These steps, 310 and 312, may alternatively be performed simultaneously or in reverse order.

The next step 314, Convert Image Format, will convert the internal formats used when recording video information from the device into more standard formats that are supported by web browsers. This step may not be necessary if the data was originally captured in a standard image format, or if a non-standard client application or plug-in will be used to render the interactive device. At this point, the size of the image may also be adjusted to improve the appearance on a standard resolution monitor. Step 316 converts the audio format. This step will convert the internal formats used when recording audio information from the device into more standard formats that are supported by web browsers. This step may not be necessary if the data was originally captured in a standard audio format, or if a non-standard client application or plug-in will be used to render the interactive device. These steps, 314 and 316, may alternatively be performed simultaneously or in reverse order.

The Convert State/Link step 318 will convert the design time information into an XML based format that can be easily interpreted by standard web browsers. Alternative embodiments of this invention may utilize other formats besides XML, but the formats may not be as efficient or standard. These other formats are within the scope of the present invention. This step may not be necessary if the original data was extracted into XML data format, or if a non-standard client application or plug-in will be used to render the interactive device.

Before determining again whether more graph nodes remain at step 304, the information just converted is saved at step 320, Save Files to Web Server Storage. This step will save the new data formats to the Run-Time Data Store location 140. The Run-Time Data Store 140 could be the same as the design-time storage location 138, but it is generally preferable to have the two storage systems separate to allow for easier deployments of run-time information.

Figure 4:
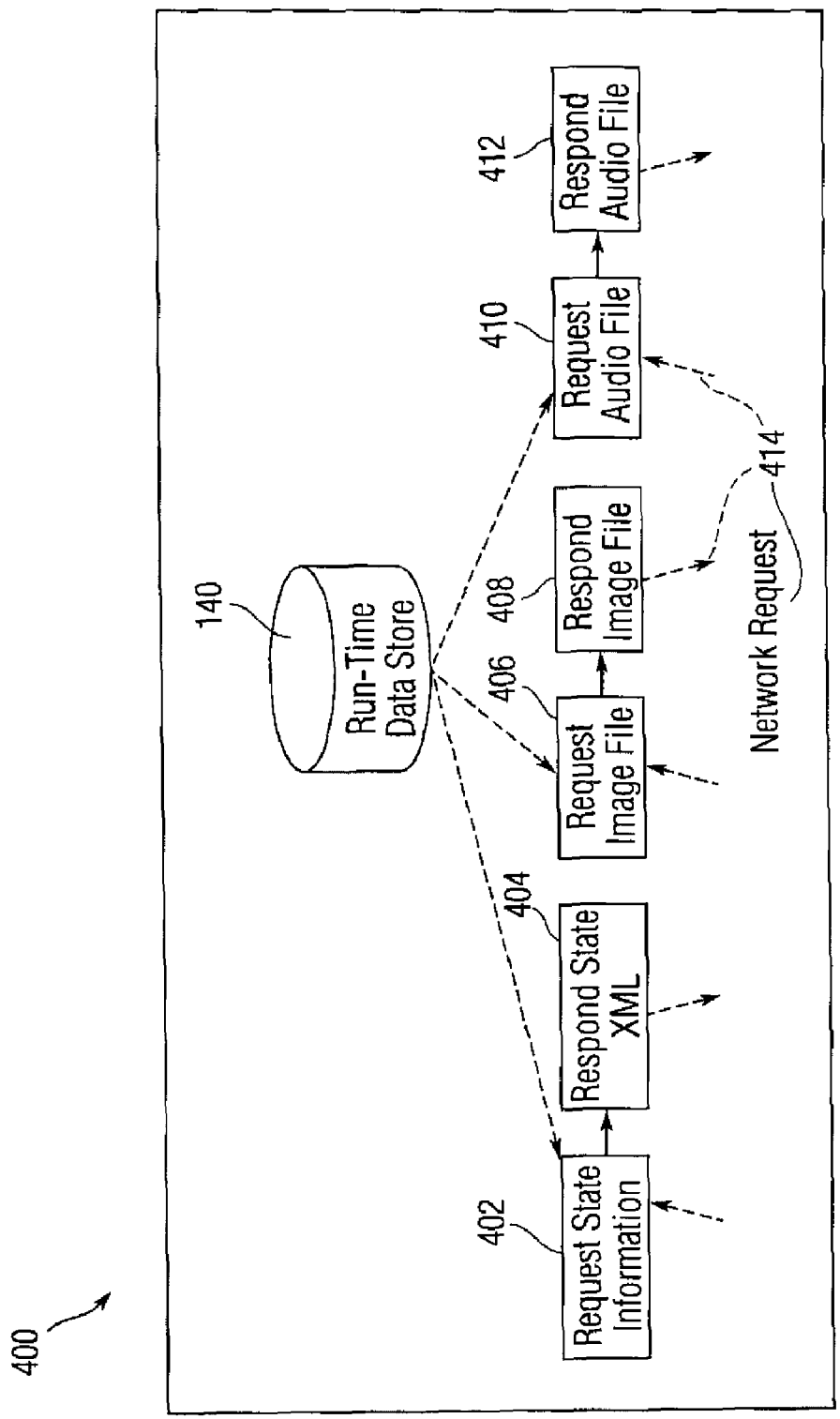
FIG. 4 illustrates an exemplary Serial/Parallel Bus conversion according to embodiments of the invention.

FIG. 4 illustrates one embodiment of the Serial/Parallel Bus Conversion 400 within the Virtual Device Run-Time Server 144, of FIG. 1. The Run-Time Server 144 is generally a standard web application server. The server may also be a custom design server, but generally it should conform to standard web request and response interactions using the HTTP protocol. If a non-standard client is being used, then the run-time server could also support non-standard formats and would not need to comply with HTTP protocol standards. This is less desirable however since it would make the system less accessible to consumers.

With reference to FIG. 4, the Virtual Device Run-Time Server 144 first requests state information at 402. This is an incoming request for information about a particular node or state in the graph. Step 402 requests the information about the state from the Run-Time Data Store 140. This request is generally made when a user navigates to a particular state, but could also be made in anticipation that a user may navigate to a particular state in the future. In this case, the information could be stored by the Run-Time Client 134 until the user actually does traverse to the state. The Virtual Device Run-Time Server 144 responds to the incoming state request with the associated XML data files representing the requested state and all navigation links from this state at block 404. The XML data will generally contain information about the state and what other types of media (images, video, audio) to request in order to properly display the state information.

If the state requires the display of one or more image files, or composite video files, the request 406 will be made. If the 406 request is made, then the requested image files will be returned at step 408 for display immediately or in the future by the client application. If the state requires playback of an audio file, the 410 request will be made for the file to play. If the 410 request is made, then the requested audio files will be returned at block 412 for playback immediately, or in the future by the client application.

The data requests and responses of the above steps 402 through 412 are sent using standard protocols over local area networks, or over the Internet. Therefore, they may be typical network requests 414. These formats are generally HTTP protocol based over lower level TCP/IP or UDP protocols.

Figure 5:
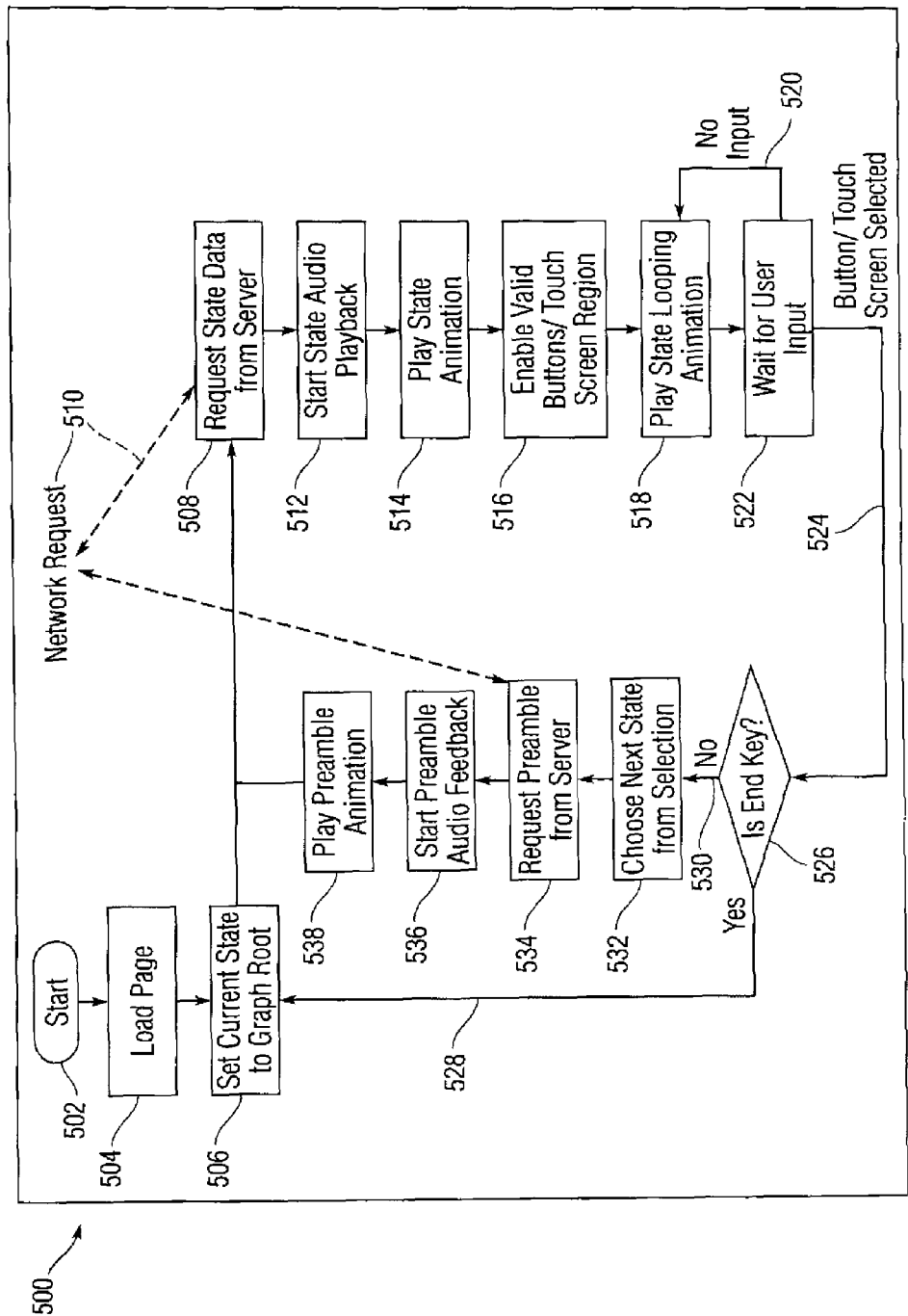
FIG. 5 illustrates exemplary Virtual Device Interactive Interface logic according to embodiments of the invention.

FIG. 5 illustrates one embodiment of the Virtual Device Interactive Interface logic 500 of the Virtual Device Interactive Interface 146 of FIG. 1. The Virtual Device Interactive Interface 146 is generally a standard web browser application. The client may also be a custom designed client, but generally it should conform to standard web request and response interactions using the HTTP protocol. If a non-standard server is being used, then the run-time client could also support non-standard formats and would not need to comply with HTTP protocol standards. This is less desirable however since it would make the system less accessible to consumers.

With reference to FIG. 5, the start 502 of the interactive client application 500 is generally navigating to a web site that is hosting the interactive client. Therefore, the interactive client application 500 generally will load 504 a wrapper HTML page and embedded client execution scripts such as Java Script.

The first step 506 in the interactive application 500 is to set the state of the graph to the root state. The root state of the graph is generally the state that represents the start, or home page, of the device user interface. The root state does not need to be the home state and can actually be any state of the graph depending on the experience intended to share with the user of the application. In one embodiment of the present invention, different entry points into the system are permitted to start at different points in the graph to highlight different capabilities of the device.

Request State Data from Web Server, 508, will request information about the current state in the system. Each state is generally represented by a simple name or numerical value and so the request will ask for the state by "name," 510. After requesting the basic information about the current state of the graph, generally several more requests 510 are necessary to fetch the video and audio information from the web server. The subsequent requests may be made in the same context as the initial request, or made implicitly by loading a document in the web browser which will make the subsequent requests. The most common form of this request is done within a client side scripting language such as Java Script. This type of request is generally referred to as an AJAX request whose request and response can be handled invisibly by client scripting calls. In cases where the requests are being made transparently, it is also possible to pre-fetch information about subsequent states in the graph. This can be valuable since it will increase the interactivity of the interactive application by reducing the latency between an action by the user and when the data is available for display.

If the requested state in the graph has recorded audio data associated with it, the audio playback will be started at this point 512. The audio may continue playing for some time in sync with the video playback. It is also possible that the audio and video animation data are encoded into a single request, and so the audio and video will be started simultaneously, 512 and 514. The Play State Animation 514 will play any single frame, or animation that represents the state the user has just navigated to. This may be accomplished by displaying one frame, or playing several minutes of animations recorded along with the state.

The Enable Valid Buttons/Touch Screen Region state 516 will enable the valid navigation buttons and touch screen regions available to the user to navigate from the current state on the device. The state of the buttons may be highlighted in some way to indicate if they are available or not. Available states may be shown in a lighter color than unavailable states, or the buttons may also visually pulsate or display some other indicator to show that they are available. It may, in some cases, be preferable to leave unavailable navigation buttons and controls enabled so that a useful message can be displayed if the user chooses that button or touch screen region.

If the state contains an un-ending looping animation (such as a blinking cursor) the animation can be played continuously 518 while waiting for input from the user 520. In some cases, during a long, but non-looping animation, user input may also be accepted to cancel the animation.

The Wait for User Input 522 simply waits for user input to one of the valid navigation controls on the virtual interactive device. There is generally no limit to the amount of time that a web application can wait, but limitations on the web server may limit the time a user may have a valid session with the server. In general, the longer the session is available, the better.

Once a user input has been received, such as a button or touch screen selection, 524, the Virtual Device Interactive Interface application 500 determines if the input was an end key 526. There may be one or more than one special function key in the interactive device that will get the user to the root of the current graph. This may be the End key of a Mobile Device, but could also be a virtual key or icon that is not available on the device itself. If the end key was pressed, the default root state is loaded and re-displayed 528.

If the user input was not an end key, the application proceeds along branch 530 to Chose Next State from Selection 532. Based on the users visual selection on the web browser, the application will translated the input into one of the available states in the graph. Generally, the virtual user interface in the web browser should look as similar as possible to the original Mobile Device 102. In the most common case, the user will click on a visual representation of one of the buttons, or other input control that exists on the physical device. Each button represents one of the available navigation paths from the current state. In the case of a touch screen, the translation is from regions of the screen, or from the location that the user selected on the image of the visual display for the device. Since the device image may be a different size than the touch screen coordinates, some coordinate translation may also be necessary at this point.

At the point where the link to traverse is known, the preamble to the next state can be requested from the server 534. The preamble is associated with the link between two states and is unique to the link. Not all links have preambles and so this state may not be necessary. To improve the responsiveness of the web application, the request may be made ahead of time for some or all of the possible links from the current state, and only the actual selected link will be displayed. If this link had an audio recording associated with it, this will be started at this point 536 so it can play synchronously with any preamble animation 538. If this link has a preamble animation associated with it, the animation can be played now 538 to lead into the next state.

Figure 6:
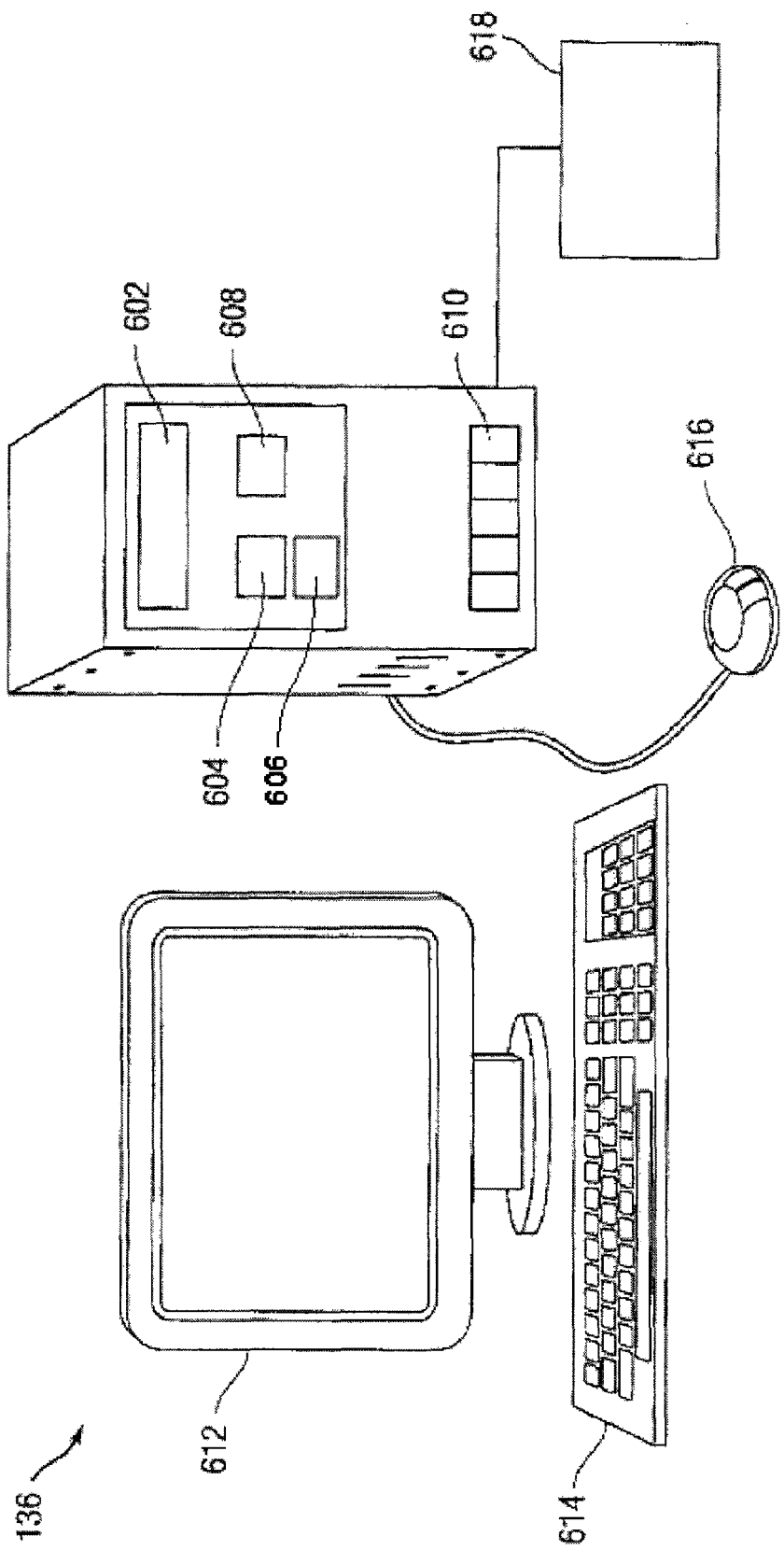
FIG. 6 illustrates an exemplary apparatus employing attributes of the Design-Time Environment and the Run-Time Environment according to embodiments of the invention.

FIG. 6 illustrates one embodiment of the general purpose computers 136 of FIG. 1, employing attributes of the Design-Time Environment 104 and the Run-Time Environment 106 according to embodiments of the invention. In FIG. 6, the general purpose computer 136 is shown with processor 602, flash 604, memory 606, and switch complex 608. The general purpose computer 600 may also include a plurality of ports 610, for input and output devices. A screen 612 may be attached to view the Design-Time Environment interface or the Run-Time Environment interface. The input devices may include a keyboard 614 or a mouse 616 to permit a user to navigate through the Design-Time Environment or the Run-Time Environment. Firmware residing in memory 606 or flash 604, which are forms of computer-readable media, can be executed by processor 604 to perform the operations described above with regard to the Design-Time Environment and the Run-Time Environment. Furthermore, memory 606 or flash 604 can store the graph node state, preamble, and transitional sequence between node information as described above. The general purpose computer may be connected to a server 618 to access a computer network or the internet.

The Design-Time Environment 104 and the Run-Time Environment 106, including the Run-Time Server 132 and the Run-Time Client 134, may all be housed within a general purpose computer 136. Each environment may be stored on the same general purpose computer, or on separate computers. The General Purpose Computers 136 are any computer system that is able to run software applications or other electronic instructions. This includes generally available computer hardware and operating systems such as a Windows PC or Apple Macintosh, or server based systems such as a Unix or Linux server. This could also include custom hardware designed to process instructions using either a general purpose CPU, or custom designed programmable logic processors based on CPLD, FPGA or any other similar type of programmable logic technologies.

Note that this firmware can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any medium that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples of the computer-readable medium include, but are not limited to, an electrical connection (electronic) having one or more wires, a portable computer diskette (magnetic), a random access memory (RAM) (magnetic), a read-only memory (ROM) (magnetic), an erasable programmable read-only memory (EPROM) (magnetic), an optical fiber (optical), portable optical disc such a CD, CD-R, CD-RW, DVD, DVD-R, or DVD-RW, or flash memory such as compact flash cards, secured digital cards, USB memory devices, a memory stick, and the like. Note that the computer-readable medium could even be paper or another suitable medium upon which the program is printed, as the program text can be electronically captured via optical scanning of the paper or other medium, then compiled, interpreted or otherwise processed in a suitable manner if necessary, and then stored in a computer memory.

Figure 7:
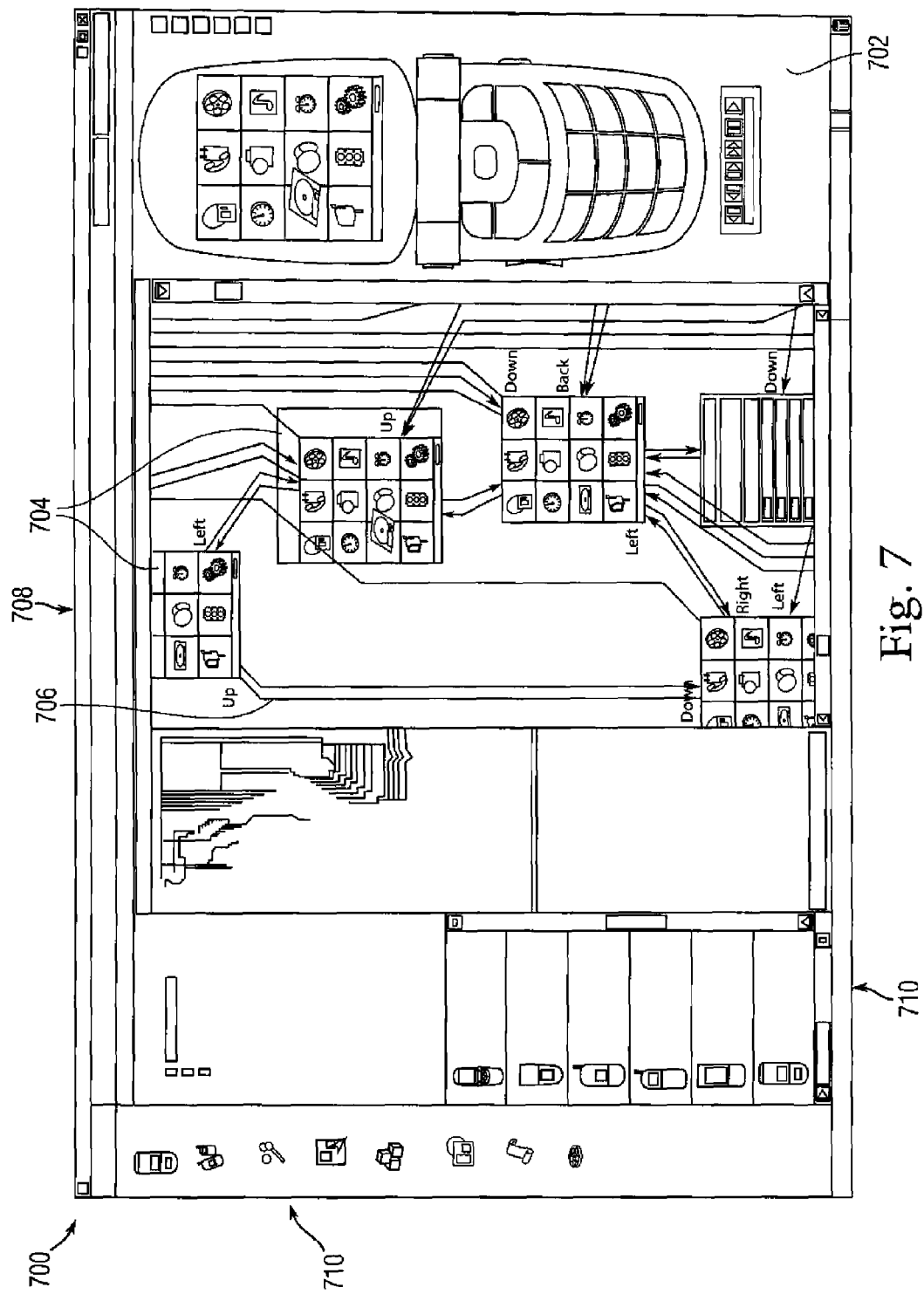
FIG. 7 illustrates an exemplary Design-Time Environment interface according to embodiments of the invention.

FIG. 7 is an example of the interface 700 of a Design-Time Environment 104, from FIG. 1, for recording information from a physical Mobile Device 102. The design environment allows for manual interaction with the device, and for building the graph states and links between the states. The device that is interacting with the Design-Time Environment 104 could reside on a local computer 136 or could be accessed remotely over a local computer network or the Internet.

The Design-Time Environment interface 700 shows the user a virtual representation of the physical mobile device 702. The Design-Time Environment creates graph nodes 704 and links 706 between these nodes as the physical device is traversed. The graph, with nodes and links, 708 may visually appear to the user or may be hidden. The Design-Time Environment interface may additionally include other menu features 710 such as a list of possible physical devices to be manipulated.

Figure 8:
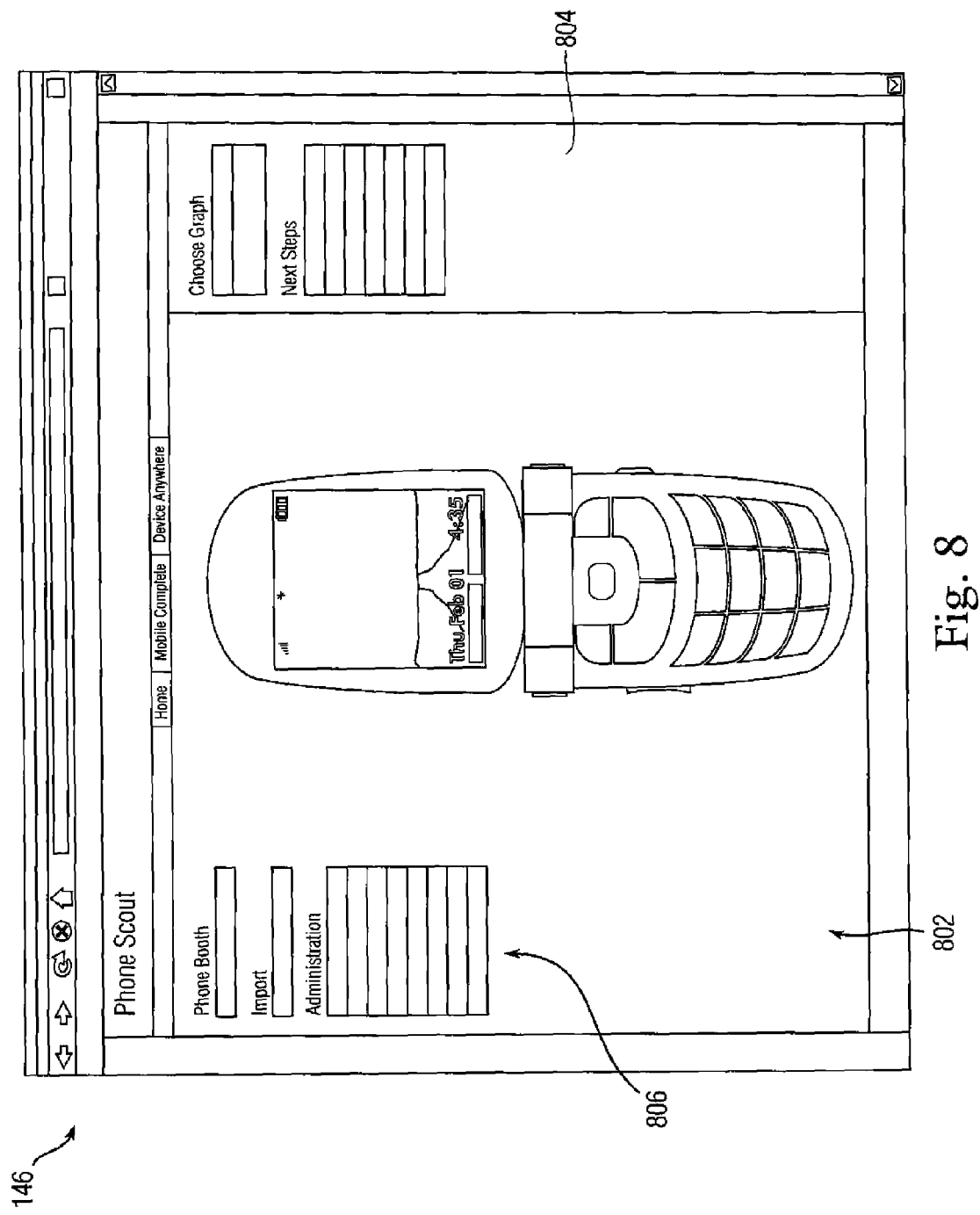
FIG. 8 illustrates an exemplary Run-Time Environment interface according to embodiments of the invention.

FIG. 8 is an example of the Virtual Device Interactive Interface 146 of the Run-Time Client Environment 134 using a standard web browser and standard web image and video formats. The Run-Time Server 132, in this example, could be a local machine, or could reside on any other server on the Internet. The Virtual Device Interactive Interface 146 may include a virtual representation 802 of the physical Mobile Device 102. The user may select inputs to traverse the features of the virtual device by directly choosing areas on the screen of the virtual representation 802, or may select from a separate menu 804 where the available buttons are listed. The Virtual Device Interactive Interface 146 may include additional menus 806. For example, one additional menu may allow the user to change between virtual devices or may permit the user to choose a set of features to emphasize, which would determine the starting node of the virtual device display.

Many alterations and modifications can be made by those having ordinary skill in the art without departing from the spirit and scope of this invention. Therefore, it must be understood that the illustrated embodiments have been set forth only for the purposes of example and that they should not be taken as limiting this invention as defined by the following claims. For instance, although many of the embodiments of the invention describe logic processes for specific results in a particular order, it should be understood that the invention is not limited to the stated order. Two or more steps may be combined into a single step or the processes may be performed out of the stated order. For example, when the application is retrieving or storing information, the described embodiment discusses the recording or playing audio and visual data as separate steps occurring in a specific order. The present invention should be understood to include combining these steps into a single step to play or record the video and audio data simultaneously or to reverse the order so the video is retrieve before the audio, or vise versa.

The words used in this specification to describe this invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements can be made for any one of the elements in the claims below or that a single element may be substituted for two or more elements in a claim.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined claim elements.

The claims are thus to be understood to include what is specifically illustrated and described above, what can be conceptionally equivalent, and what can be obviously substituted. For instance, the term "computer" or "general purpose computer" as recited in the claims shall be inclusive of at least a desktop computer, a laptop computer, or any mobile computing device such as a mobile communication device (e.g., a cellular or Wi-Fi/Skype phone, e-mail communication devices, personal digital assistant devices), and multimedia reproduction devices (e.g., iPod, MP3 players, or any digital graphics/photo reproducing devices). The general purpose computer may alternatively be a specific apparatus designed to support only the recording or playback functions of embodiments of the present invention. For example, the general purpose computer may be a device that integrates or connects with a Mobile Device, and is programmed solely to interact with the device and record the audio and visual data responses.

What is claimed is:

1. A method for providing recordings of interactions with a physical mobile device for subsequent simulation in a virtual environment, comprising:
    detecting a stimulation of a control input to the physical mobile device through an interface;
    generating a recording of an occurrence of a response produced, in response to said stimulation, by the physical mobile device;
    creating a new state in a graph of states of the physical mobile device based on the response;
    storing the generated recording of the occurrence of the response; and
    processing the stored recording into a playback recording of the occurrence of said response for the virtual environment.

2. The method of claim 1, further comprising determining a path not yet navigated and choosing the control input to select the path.

3. The method of claim 1, further comprising splitting the generated recording into an existing state and a preamble sequence between states.

4. The method of claim 3, further comprising creating a canonical sample by filtering dynamic information from the existing state.

5. The method of claim 4, further comprising comparing the canonical sample to all previous canonical samples to determine if the canonical sample has been previously stored.

6. The method of claim 1, further comprising running an application, wherein the application navigates recordings of previous responses based on a user choice.

7. The method of claim 6, wherein the application displays an initial state based on a set of desired features to emphasize to a user.

8. The method of claim 6, wherein the application displays a virtual representation of the mobile device and permits a user to navigate through a virtual interface to simulate a physical interaction with the mobile device.

9. A method for simulating interactions with a physical mobile device through a virtual environment, comprising:
    displaying a virtual device interactive interface representing the physical mobile device;
    accepting a user choice through the virtual device interactive interface;
    traversing a graph of states of the physical mobile device to a current state based on the user choice, the current stte previously created in the graph based on a response previously produced by the physical mobile device in response to an actual stimulation of the physical mobile device; and
    playing a playback recording asociated with the current state in the virtual environment, the played playback recording replaying an occurrence of the response previously produced by the physical mobile device in response to the actual stimulation of the physical mobile device.

10. The method of claim 9, wherein the virtual device interactive interface represents a physical mobile device, which simulates actual interactions with the physical mobile device.

11. The method of claim 9, wherein an initial virtual device interactive interface is chosen based on a set of interactions to emphasize to a user.

12. The method of claim 9, wherein the playing simulates a physical response of the mobile device.

13. The method of claim 9, further comprising waiting for an additional user choice and playing an associated animation in response to the additional user choice.

14. An apparatus for providing recordings of interactions with a physical mobile device for subsequent simulation in a virtual environment, comprising:
    an interface configured for connecting to the physical mobile device;
    one or more processors programmed for:
        selecting a control input to the physical mobile device through the interface,
        generating a recording of an occurrence of a response produced, in response to said stimulation, by the physical mobile device,
        creating a new state in a graph of states of the physical mobile device based on the response,
        storing the generated recording of the occurrence of the response and
        processing the stored recording into a playback recording of the occurrence of said response for the virtual environment.

15. The apparatus of claim 14, said one or more processors further programmed for determining a path not yet navigated and choosing the control input to select the path.

16. The apparatus of claim 14, said one or more processors further programmed for splitting the generated recording into an existing state and a preamble sequence between states.

17. The apparatus of claim 16, said one or more processors further programmed for creating a canonical sample by filtering dynamic information from the existing state.

18. An apparatus for simulating interactions with a physical mobile device through a virtual environment, comprising:
    one or more processors programmed for
        displaying a virtual device interactive interface representing the physical mobile device,
        accepting a user choice through a user input,
        traversing a graph of states of the physical mobile device to a current state based on the user choice, the current state previously created in the graph based on a response previously produced by the physical mobile device in response to an actual stimulation of the physical mobile device, and playing a playback recording associated with the current state in the virtual environment to simulate an actual response of the physical mobile device based on the user choice, the played playback recording replaying an occurrence of the response previously produced by the physical mobile device in response to the actual stimulation of the physical mobile device.

19. The apparatus of claim 18, wherein an initial virtual device interactive interface is chosen based on a set of interactions to emphasize to a user.

20. The apparatus of claim 18, wherein the one or more processors is further programmed for waiting for an additional user choice and playing an associated animation in response to the additional user choice.

21. A non-transitory computer-readable medium comprising program code for providing recordings of interactions with a physical mobile device for subsequent simulation in a virtual environment, the program code for causing performance of a method comprising:
   detecting a stimulation of a control input to the physical mobile device through an interface,
   generating a recording of an occurrence of a response produced, in response to said stimulation, by the physical mobile device,
   creating a new state in a graph of states of the physical mobile device based on the response,
   storing the generated recording of the occurrence of the response; and
   processing the stored recording into a playback recording of the occurrence of said response for the virtual environment.

22. The non-transitory computer-readable medium of claim 21, the program code further for causing performance of the method comprising determining a path not yet navigated and choosing the control input to select the path.

23. The non-transitory computer-readable medium of claim 21, the program code further for causing performance of the method comprising splitting the generated recording into an existing state and a preamble sequence between states.

24. The non-transitory computer-readable medium of claim 23, the program code further for causing performance of the method comprising creating a canonical sample by filtering dynamic information from the existing state.

25. A non-transitory computer-readable medium comprising program code for simulating interactions with a physical mobile device through a virtual environment, the program code for causing performance of a method comprising:
   displaying a virtual device interactive interface representing the physical mobile device;
   accepting a user choice based on the virtual device interactive interface;
   traversing a graph of states of the physical mobile device to a current state based on the user choice, the current state previously created in the graph based on a response previously produced by the physical mobile device in response to an actual stimulation of the physical mobile device; and
   playing a playback recording associated with the current state in the virtual environment, the played playback recording replaying an occurrence of a response previously produced by the physical mobile device in response to an actual stimulation of the physical mobile device.

26. The non-transitory computer-readable medium of claim 25, the program code further for causing performance of the method comprising choosing an initial virtual device interactive interface based on a set of interactions to emphasize to a user.

27. The non-transitory computer-readable medium of claim 25, the program code further for causing performance of the method comprising simulating a physical response of the mobile device.

28. The non-transitory computer-readable medium of claim 25, the program code further for causing performance of the method comprising waiting for an additional user choice and playing an associated animation in response to the additional user choice.

* * * * *